United States Patent
Kleiman et al.

(10) Patent No.: US 8,549,222 B1
(45) Date of Patent: Oct. 1, 2013

(54) CACHE-BASED STORAGE SYSTEM ARCHITECTURE

(75) Inventors: Steven R. Kleiman, Los Altos, CA (US); Steven C. Miller, Livermore, CA (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 774 days.

(21) Appl. No.: 12/369,502

(22) Filed: Feb. 11, 2009

Related U.S. Application Data

(60) Provisional application No. 61/028,094, filed on Feb. 12, 2008.

(51) Int. Cl.
*G06F 12/00* (2006.01)

(52) U.S. Cl.
USPC ........... 711/114; 711/103; 711/113; 711/118; 711/133; 711/165

(58) Field of Classification Search
USPC .................................. 711/113, 114, 118, 165
See application file for complete search history.

(56) References Cited

U.S. PATENT DOCUMENTS

| | | | |
|---|---|---|---|
| 5,819,292 A | 10/1998 | Hitz et al. | |
| 6,148,368 A | 11/2000 | DeKoning | |
| 6,219,693 B1 | 4/2001 | Napolitano et al. | |
| 6,516,380 B2 | 2/2003 | Kenchammana-Hoskote et al. | |
| 7,200,715 B2 | 4/2007 | Kleiman et al. | |
| 7,409,494 B2 | 8/2008 | Edwards et al. | |
| 7,707,263 B1 * | 4/2010 | Cramer et al. | 709/212 |
| 7,890,795 B1 * | 2/2011 | Madnani et al. | 714/6.2 |
| 2002/0035666 A1 * | 3/2002 | Beardsley et al. | 711/114 |
| 2005/0243609 A1 * | 11/2005 | Yang et al. | 365/189.05 |
| 2006/0143396 A1 * | 6/2006 | Cabot | 711/134 |
| 2006/0174156 A1 * | 8/2006 | Balasubramanian | 714/6 |
| 2009/0172335 A1 * | 7/2009 | Kulkarni et al. | 711/170 |

OTHER PUBLICATIONS

U.S. Appl. No. 61/028,094, filed Feb. 12, 2008, entitled Cache-Based Storage System Architecture, by Steven R. Kleiman, et al., 30 pages.
U.S. Appl. No. 61/028,107, filed Feb. 12 2008, entitled Hybrid Media Storage System Architecture, by Jeffrey S. Kimmel, et al., 32 pages.
PCT Application Serial No., entitled Hybrid Media Storage System Architecture, filed on Feb. 11, 2009, by NetApp, Inc., 33 pages.
Baek, Sung Hoon, et al., "Matrix-Stripe-Cache-Based Contiguity Transform for Fragmented Writes in RAID-5", IEEE Transactions on Computers, vol. 56, No. 8, Aug. 2007, pp. 1040-1054.

(Continued)

*Primary Examiner* — Reginald Bragdon
*Assistant Examiner* — Gurtej Bansal
(74) *Attorney, Agent, or Firm* — Cesari and McKenna, LLP

(57) ABSTRACT

A cache-based storage architecture has primary and secondary storage subsystems that are controlled by first and second data layout engines to provide a high-performance storage system. The primary storage subsystem illustratively comprises non-volatile electronic storage media configured as a cache, while the secondary storage subsystem comprises magnetic storage media configured as a disk array. The data layout engines illustratively implement data layout techniques that improve read and write performance to the primary and secondary storage subsystems. To that end, the data layout engines cooperate to optimize the use of the non-volatile cache as a primary storage stage that efficiently serves random data access operations prior to substantially transposing them into sequential data access operations for permanent (or archival) storage on the disk array.

17 Claims, 4 Drawing Sheets

(56) References Cited

OTHER PUBLICATIONS

Gal, Eran, et al., "Algorithms and Data Structures for Flash Memories", ACM Computing Surveys, vol. 37, No. 2, Jun. 2005, pp. 138-163.

EMC[2], "EMC in Major Storage Performance Breakthrough; First with Enterprise-Ready Solid State Flash Drive Technology", On-Line Press Release; http://www.prnewswire.com/mnr/emc/31368/, Released Jan. 14, 2008, EMC Corporation, Hopkington, MA, printed Jan. 14, 2009, 4 pages.

EMC[2], "EMC Symmetrix DMX Series" Jan. 2008 Data Sheet C1005.11, EMC Corporation, Hopkington MA, Jan. 2008, 8 pages.

Storagezilla, "Enterprise FLASH Drives for DMX-4 (Completed)," On-Line Press Release; http://storagezilla.typepad.com/storagezilla/2008/01/enterprise-flas.html, released Jan. 14, 2008, Storagezilla, Printed Jan. 30, 2009, 8 pages.

Vance, Ashlee, "Wozniak Accepts Post at a Storage Start-Up", On-Line News Clip, http://www.nytimes.com/2009/02/05/technology/business-computing/05wozniak.html, published Feb. 4, 2009, The New York Times, 3 pages.

* cited by examiner

CACHE-BASED STORAGE SYSTEM ARCHITECTURE

RELATED APPLICATION

The present application claims priority to commonly-owned, U.S. Provisional Application No. 61/028,094, filed Feb. 12, 2008, entitled CACHE-BASED STORAGE SYSTEM ARCHITECTURE, by Steven R. Kleiman, et al., the contents of which are incorporated herein by reference.

The present application is also related to commonly-owned, copending PCT Patent Application No. PCT/US2009/000849, filed Feb. 11, 2009, by Jeffrey S. Kimmel et al., entitled HYBRID MEDIA STORAGE SYSTEM ARCHITECTURE.

FIELD OF THE INVENTION

The present invention relates to storage systems and, more specifically, to a storage architecture of a storage system.

BACKGROUND OF THE INVENTION

A storage system is a computer that provides storage service relating to the organization of data on writable persistent storage media, such as non-volatile memories and disks. The storage system may be configured to operate according to a client/server model of information delivery to thereby enable many clients (e.g., applications) to access the data served by the system. The storage system typically employs a storage architecture that serves the data in file system and block formats with both random and streaming access patterns. Disks generally provide good streaming performance (e.g., reading of large sequential blocks or "track reads") but do not perform well on random access (i.e., reading and writing of individual disk sectors). In other words, disks operate most efficiently in streaming or sequential mode, whereas small random block operations can substantially slow the performance of disks.

One way to improve performance of the storage architecture of the storage system is through the use of caching. The term "caching" typically denotes temporary storage of often-accessed data in high-speed cache memories or "caches". The caches are often constructed using dynamic random access memory (DRAM) technology. DRAM technology is generally embodied as volatile, electronic memory media that provides the benefit of good read/write random performance and low latency. The improvement provided by caching is both application and size dependent, with large caches providing better improvement. Large caches allow grouping of data into sufficiently large blocks such that the disks may be substantially accessed in a streaming fashion. However, in addition to being volatile, large DRAM caches are cost prohibitive.

SUMMARY OF THE INVENTION

The present invention overcomes the disadvantages of the prior art by providing a cache-based storage architecture having primary and secondary storage subsystems that are controlled by first and second data layout engines to provide a high-performance storage system. The primary storage subsystem illustratively comprises non-volatile electronic storage media configured as a cache, while the secondary storage subsystem comprises magnetic storage media configured as a disk array. The data layout engines illustratively implement data layout techniques that improve read and write performance to the primary and secondary storage subsystems. To that end, the data layout engines cooperate to optimize the use of the non-volatile cache as a primary storage stage that efficiently serves random data access operations prior to substantially transposing them into sequential data access operations for permanent (or archival) storage on the disk array.

In an illustrative embodiment, the non-volatile cache of the primary storage subsystem is embodied as a flash memory cache ("flash cache"), while the disk array of the secondary storage subsystem is embodied as slow inexpensive magnetic disk drives ("disks"). The disks of the array are illustratively organized as one or more groups, wherein each group may be operated as a Redundant Array of Independent (or Inexpensive) Disks (RAID). Moreover, the data layout engines are illustratively embodied as file systems configured to implement file system techniques that (i) store randomly accessed data (via, e.g., read and write operations) in the flash cache until a sufficient amount of the data is accumulated therein, and (ii) retrieve selected data that is "evicted" from the cache and written to disk in accordance with, e.g., a set of policies. By accumulating enough data associated with these random access operations in the cache, optimized write allocation decisions may be rendered to store the evicted data on the disks. Notably, these write allocation decisions are RAID efficient with a write-in-place layout on disk.

Specifically, a first file system, e.g., a write anywhere file system, implements a first set of file system techniques to obtain improved write performance from the flash cache with respect to the random operations. Subsequent to the storage of data in the flash cache, a policy engine implements the set of policies to select certain of the data for eviction. A second file system, e.g., a write in-place file system, implements a second set of file system techniques to leverage the fast random read performance capabilities of the flash cache to write the selected data as a "tetris" input/output (I/O) transaction to the disk array, thereby improving performance of the disks. That is, the write in-place file system relocates the selected data to the disks in a streaming fashion using a data layout construct (i.e., the tetris I/O transaction) that represents an array of data blocks on the disks. By enabling operation of the secondary storage subsystem in sequential or streaming mode for a majority of its accesses, the storage architecture enables use of the slow, inexpensive disks to provide higher bandwidth and lower latency performance to client applications than conventional storage systems.

Advantageously, the use of non-volatile memory as a cache enables construction of a relatively large cache with additional storage capacity compared to conventional storage system caches. The non-volatile cache may then be configured to store and serve frequently accessed data at performance levels that exceed those of conventional storage systems. Given the read performance of a large non-volatile cache capable of staging a sufficient amount of data, the optimizing file system techniques can effectively transpose random write operations to a sequential context (via the tetris I/O transaction) when writing data to the disks, thereby ensuring efficient operation of the disks. Slow, inexpensive disks may thus be employed as secondary storage for storing non-frequently accessed data used, e.g., to refill the cache, as well as to store "point-in-time" data images and compliance data. This feature of the storage architecture results in substantial performance improvement over conventional disk-based systems, thereby enabling use of substantially fewer, e.g., larger, slower inexpensive disks in the secondary storage subsystem.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

Figure 1:
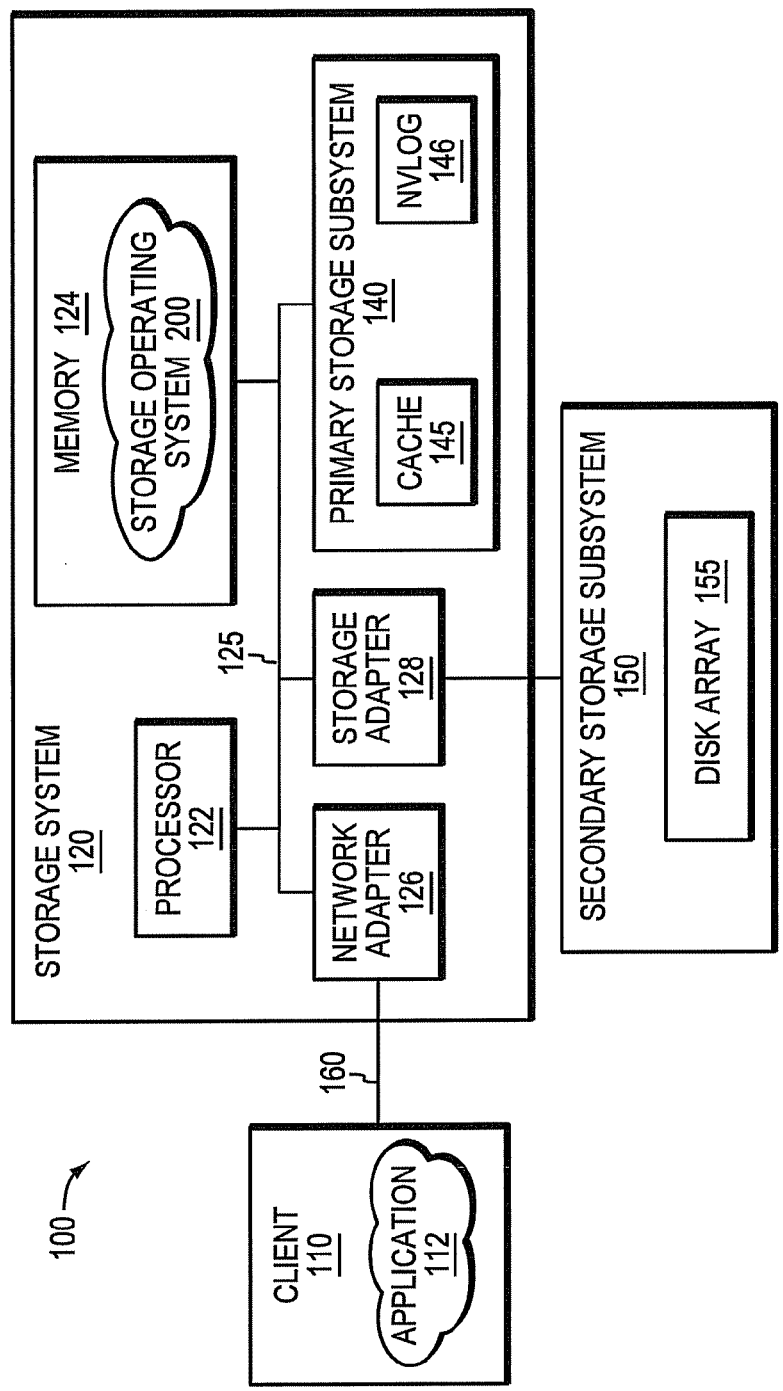
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable, persistent electronic and magnetic storage media of primary and secondary storage subsystems, respectively. To that end, the storage system 120 comprises a processor 122, a memory 124, a network adapter 126, a storage adapter 128 and a primary storage subsystem 140 interconnected by a system bus 125. The storage system 120 also includes a storage operating system 200 that implements a virtualization system to logically organize the information as a hierarchical structure of data containers, such as files and logical units (LUNs), on the primary and secondary storage subsystems 140, 150.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures. The storage operating system 200, portions of which are typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the embodiments described herein.

The primary storage subsystem 140 illustratively comprises non-volatile electronic storage configured to provide a persistent, storage space capable of maintaining data, e.g., in the event of a power loss to the storage system. Accordingly, the primary storage subsystem 140 may be embodied as a large-volume array of solid-state devices (SSDs), a flash memory array (e.g., a flash memory), phase change memory or other non-volatile semiconductor memory having either a back-up battery, or other built-in laststate-retention capabilities, that holds the last state of the memory in the event of any power loss to the array. As described herein, portions of the primary storage subsystem are illustratively organized as a non-volatile cache 145 and a non-volatile log (NVLOG 146), the latter used to temporarily store ("log") certain data access operations, such as write operations, that are processed by a virtualization system prior to storing the data associated with those operations to the cache 145 during a consistency model event, e.g., a consistency point (CP), of the system. An example of a consistency point is described in U.S. Pat. No. 5,819,292, issued Oct. 6, 1998, entitled Method for Maintaining Consistent States of a File System and for Creating User-Accessible Read-Only Copies of a File System, by David Hitz, et al. and assigned to Network Appliance, Inc., which is hereby incorporated by reference.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging packets over the network 160. The clients may issue packets including file-based access protocols, such as the Common Internet File System (CIFS) protocol or Network File System (NFS) protocol, over TCP/IP when accessing information in the form of files. Alternatively, the client may issue packets including block-based access protocols, such as the Small Computer Systems Interface (SCSI) protocol encapsulated over TCP (iSCSI), SCSI encapsulated Fibre Channel (FC) over Ethernet (FCoE) and SCSI encapsulated over FC (FCP), when accessing information in the form of LUNs.

The storage adapter 128 cooperates with the storage operating system 200 executing on the storage system to access information requested by the client. The information may be stored on the primary storage subsystem 140, as well as the secondary storage subsystem 150, which illustratively comprises magnetic storage media configured as a disk array 155. The storage adapter includes input/output (I/O) interface circuitry that couples to the disk array 155 over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the network adapter 126, where the information is formatted into a packet and returned to the client 110.

Figure 2:
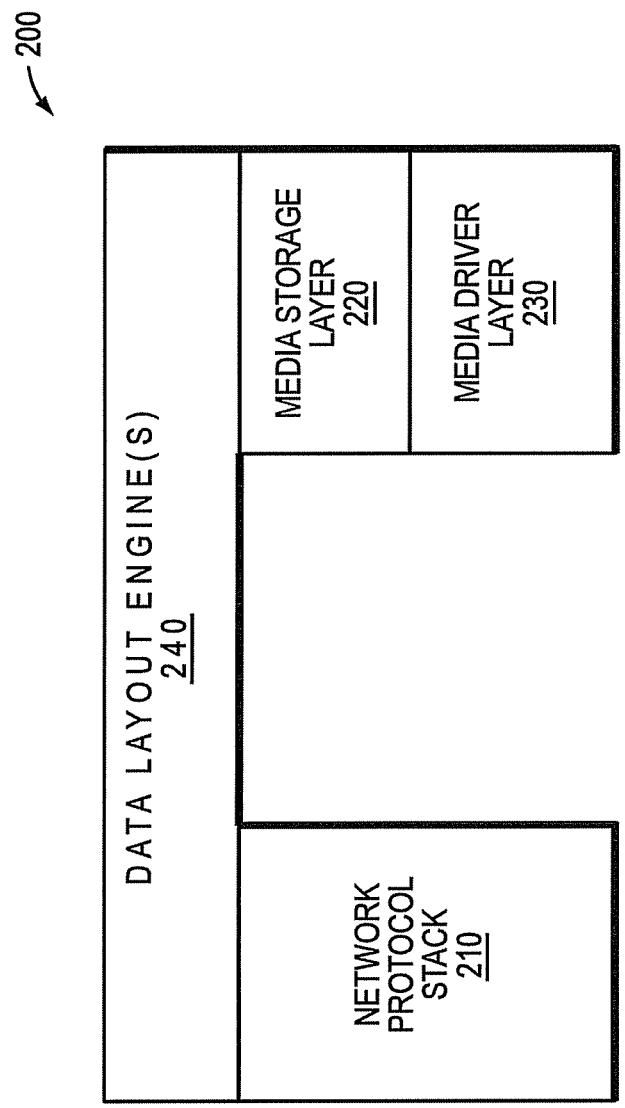
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers, including a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.) organized as a network protocol stack 210. In addition, the storage operating system 200 includes a media storage layer 220 that implements a storage media protocol, such as a Redundant Array of Independent (or Inexpensive) Disks (RAID) protocol, and a media driver layer 230 that implements a storage media access protocol such as, e.g., a Small Computer Systems Interface (SCSI) protocol. As described herein, the media storage layer 220 may alternatively be implemented as a parity protection (RAID) module and embodied as a separate hardware component, such as a disk controller.

Bridging the storage media software layers with the network and file system protocol layers is a virtualization system that may be embodied as one or more data layout engines 240. The data layout engines illustratively implement data layout techniques that improve read and write performance to the primary and secondary storage subsystems 140, 150. To that end, the data layout engines 240 cooperate to optimize the use of the non-volatile cache 145 as a primary storage stage that efficiently serves random data access operations prior to substantially transposing them into sequential data access operations for permanent (or archival) storage on the disk array 155.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention is directed to a cache-based storage architecture having primary and secondary storage subsystems that are controlled by first and second data layout engines to provide a high-performance storage system. In an illustrative embodiment, the non-volatile cache 145 of the primary storage subsystem 140 is embodied as a flash memory cache (hereinafter "flash cache 145"), while the disk array 155 of the secondary storage subsystem 150 is embodied as slow inexpensive magnetic disk drives ("disks") organized as one or more RAID groups. Moreover, the data layout engines 240 are illustratively embodied as file systems configured to implement file system techniques that (i) store randomly accessed data (via, e.g., read and write operations) in the flash cache 145 until a sufficient amount of the data is accumulated therein, and (ii) retrieve selected data that is "evicted" from the cache and written to disk in accordance with, e.g., a set of policies. By accumulating enough data associated with these random access operations in the cache, optimized write allocation decisions may be rendered to store the evicted data on the disks. Notably, these write allocation decisions are RAID efficient with a write-in-place layout on disk. A write-in-place file system, as described further herein, is configured to overwrite existing data, i.e., changes to data blocks on disk are written to the same locations of those blocks on disk.

Further to an illustrative embodiment, the flash cache 145 is operated as a write-back cache that is constructed using non-volatile, solid-state NAND flash devices. However, it will be understood to those skilled in the art that other block-oriented, non-volatile electronic devices may be used in accordance with the teachings of the invention. The NAND flash devices are illustratively block-oriented devices having good (random) read performance, i.e., read operations to flash devices are substantially faster than write operations, primarily because of their storage model. In addition, NAND flash memory technology offers a substantial size per dollar improvement over DRAM technology, thereby allowing economical construction of large caches.

Data stored on a flash device are accessed (e.g., via read and write operations) in units of pages, which are illustratively 4 kB in size, although other page sizes (e.g., 2 kB) may also be advantageously used with the present invention. To rewrite previously written data on a page, the page must be erased; yet the unit of erasure is a block comprising a plurality of (e.g., 64) pages, i.e., an erase block having a size of 256 kB. Therefore, even though data stored on the device can be accessed (read and written) on a page basis, clearing or erasing of the device takes place on a block basis. A reason for the slow random write performance of a flash device involves management of free space in the device, i.e., if there is not sufficient storage space to accommodate write operations to pages of a block, valid data must be moved to another block within the device, so that the pages of an entire block can be erased and freed for future allocation. Such write behavior of the flash device typically constrains its effectiveness in systems where random write performance is a requirement. The present invention described herein is directed, in part, to improving random write performance from the flash cache.

A typical implementation of a cache stores data that has resources assigned or provisioned for it in the secondary storage subsystem. These resources include (i) a logical identity or descriptor (e.g., a handle) by which the secondary storage subsystem can access the data, (ii) storage capacity reserved for the data in the secondary storage subsystem and (iii) a physical address for the data in the secondary storage subsystem. However, the flash cache described herein may be implemented without one or more of these resources being provisioned in the secondary storage subsystem. For example, in one embodiment, data stored in the flash cache may have a logical identity in the secondary storage subsystem, but no storage capacity or physical address provisioned for it in that subsystem. In an alternate embodiment, data stored in the flash cache may have no logical identity, storage capacity or physical address provisioned in the secondary storage subsystem (i.e., the data resides only in the flash cache).

Figure 3:
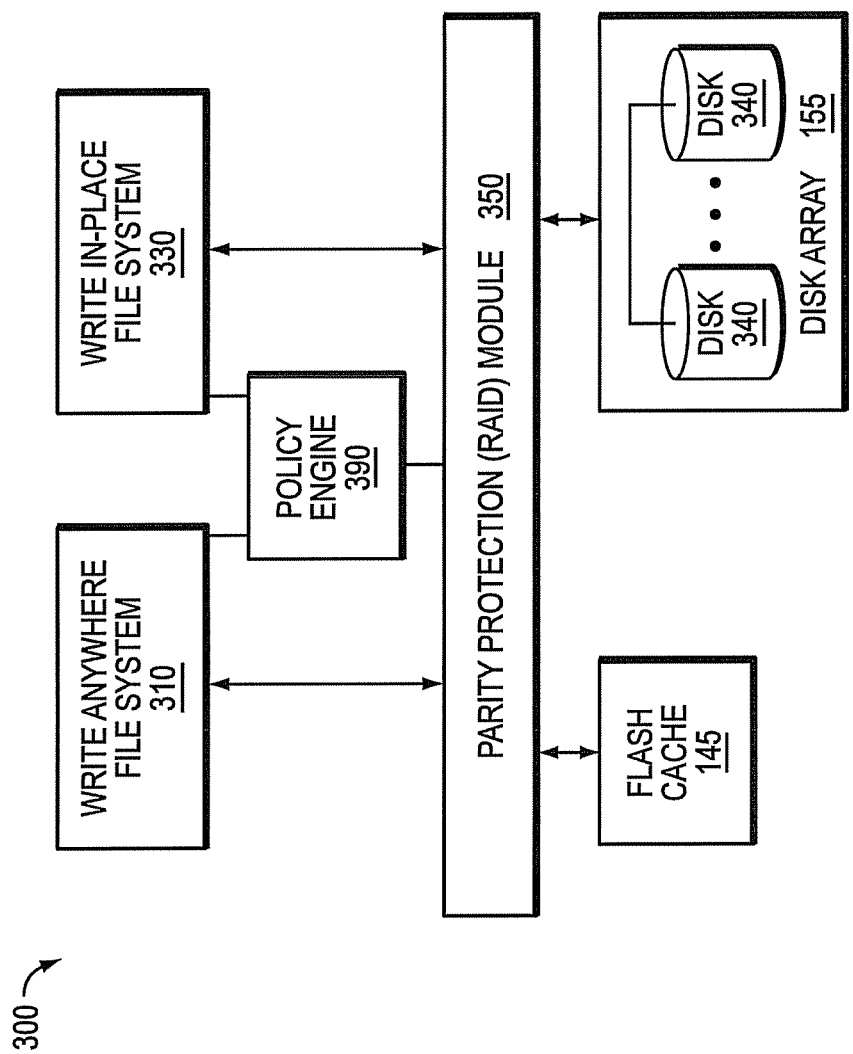
FIG. 3 is a schematic block diagram illustrating organization of a cache-based storage architecture of the present invention.

FIG. 3 is a schematic block diagram illustrating organization of the cache-based storage architecture 300 of the present invention. Specifically, a first file system, e.g., a write anywhere file system 310, implements a first set of file system techniques to obtain improved write performance from the flash cache 145 with respect to random access operations. The write anywhere file system is illustratively a log-structured file system having a data layout format that provides fast write access to data containers, such as files, thereby enabling efficient servicing of random (and sequential) data access operations directed to the flash cache. To that end, the write anywhere techniques implemented by the file system 310 enable placement of data anywhere in free, available space on the flash devices of the flash cache 145. An advantage of a write anywhere file system is that the file system never overwrites data in-place and keeps track of logical variants of the data and can ultimately discard variants that are no longer relevant.

Although it improves random write performance, the write anywhere property of the file system 310 may often fragment sequential data, which manifests as performance degradation for certain storage media, such as disks, because of the mechanical positioning required to access the fragmented data during read operations (and, in particular, during sequential read operations). However, since the flash cache is constructed in this embodiment as solid-state NAND flash devices, random read access is consistent (i.e., not based on mechanical positioning, as with disk). Accordingly, the write anywhere file system 310 cooperates with the flash devices to provide an ideal data layout engine for the flash cache 145 that improves write performance without degrading the (random) read performance of the cache.

The write anywhere file system 310 is illustratively a message-based system having a format representation that is block-based using, e.g., 4 kilobyte (kB) blocks and using index nodes ("inodes") to describe the data containers, e.g., files. The file system 310 provides semantic capabilities for use in file-based access to information stored on the storage devices, such as the NAND flash devices, of the flash cache 145. In addition, the file system provides volume management capabilities for use in block-based access to the stored information. That is, in addition to providing file system semantics, the file system 310 provides functions such as (i) aggregation of the flash devices, (ii) aggregation of storage bandwidth of the devices, and (iii) reliability guarantees, such as mirroring and/or parity (RAID).

As for the latter, the write anywhere file system 310 further cooperates with a parity protection (RAID) module 350, e.g., of media storage layer 220, to control storage operations to the flash cache 145. Illustratively, there is a hierarchy of reliability controls associated with the flash cache 145. For example, each flash device incorporates error correction code (ECC) capabilities on a page basis. This provides a low level of reliability control for the page within a flash block. A higher level of reliability control is further implemented when embodying flash blocks within a plurality of SSDs, such as flash devices, to enable recovery from errors when one or more of those devices fail.

In an illustrative embodiment, the high level of reliability control is embodied as a redundancy arrangement, such as a RAID level implementation, configured by the RAID module 350. A RAID implementation, e.g., a RAID 1, 3, 4, 5 or 6 implementation, provides an extra level of protection over the flash cache 145 in the event of, e.g., failure to one or more flash devices. That is, the RAID implementation enhances the reliability/integrity of data storage through the writing of data "stripes" across a given number of flash devices in a RAID group, and the appropriate storing of redundant information, e.g., parity, with respect to the striped data.

Illustratively, the RAID module 350 organizes a plurality of flash devices as one or more parity groups (e.g., RAID groups), and manages parity computations and topology information used for placement of data on the devices of each group. To that end, the RAID module further organizes the data as stripes of blocks within the RAID groups, wherein a stripe may comprise correspondingly located flash pages across the flash devices. That is, a stripe may span a first page 0 on flash device 0, a second page 0 on flash device 1, etc. across the entire RAID group with parity being distributed among the pages of the devices. Note that other RAID group arrangements are possible, such as providing a logical RAID implementation wherein every predetermined (e.g., $8^{th}$) block in a file is a parity block.

In addition, the RAID module 350 exports the topology information for use by the write anywhere file system 310 when performing write allocation of data, i.e., when searching for free, unallocated space in a volume block number (vbn) storage space of the flash cache 145. In an illustrative embodiment, the topology information comprises vbnto-dbn (device block number) mappings. Block allocation accounting structures used by the write anywhere file system 310 to perform write allocation are sized to accommodate writing of data to the flash cache 145 in sequential order. To that end, the file system 310 illustratively performs write allocation sequentially, e.g., on a 256 kB flash block basis in the cache; i.e., the vbn in the flash cache is illustratively mapped to a 256 kB flash block.

Once a flash block is erased and designated "freed" (e.g., as a free vbn), data may be written (in accordance with write operations of a CP) by the storage operating system sequentially through the sixty-four 4 kB pages (e.g., page 0 through page 63) in the flash block, at which time a next free flash block is accessed and write operations occur sequentially from page 0 to page 63. The accounting structures, e.g., free block maps, used by the write anywhere file system 310 are illustratively maintained by a segment cleaning process and indicate free flash blocks available for allocation.

Illustratively, the free vbns of the flash cache may be organized into a data structure, such as a sequential list. When nearing the end of free vbns on the list, segment cleaning is performed to free-up one or more selected flash blocks. Pages of these selected flash blocks that contain valid data ("valid pages") are moved to different flash blocks and the selected flash blocks are erased to become free flash blocks (vbns). In this manner, operation of the file system 310 is leveraged to provide write anywhere capabilities, including segment cleaning, on the flash cache 145 of the primary storage subsystem 140. Illustratively, the segment cleaning process may be embodied as a scanner of the write anywhere file system that operates with a write allocator within file system to traverse (walk) buffer and mode trees when "cleaning" (clearing) the flash devices.

Subsequent to the storage of data in the flash cache, a policy engine 390 implements the set of policies to select data in the cache for eviction. In an illustrative embodiment, the policy engine 390 may be embodied as a cache manager of the storage operating system 200, although it will be apparent to those skilled in the art that the engine 390 may also be embodied within the segment cleaning process of the write anywhere file system 310. The set of policies may be employed as "triggers" to select data and initiate eviction ("flushing") of the selected data from the flash cache to disks 340 of array 155. Illustratively, these triggers may include, among others described herein, eviction policies such as least recently used/accessed (LRU) and/or data type prioritization. The eviction policies can be either block or file based (e.g., evict an entire file that has not been accessed). The policy engine illustratively operates on information stored in the metadata that describes the data stored in the cache. For example, data comprising a database may be prioritized to remain resident in the cache ahead of other data. In addition, read data may be prioritized ahead of write data, which is eventually flushed to the disk array in accordance with the write-back property of the flash cache.

As noted, the flash cache is illustratively operated as a write-back cache; accordingly, if a write operation can be serviced from the cache (i.e., a "cache hit"), the data in the cache may be replaced (at some logical block location), assuming that the data has not been evicted. Note that, as used herein, the term "replaced" means that the data at the logical block location is rewritten, but in physical terms the old copy is invalidated (although not necessarily erased) and the new data is written to an erased and likely different physical location. However, operation of the write-back flash cache must accommodate the presence of "point-in-time" data images (i.e., snapshots). For example, assume a snapshot is generated by the write anywhere file system 310 and staged in the cache 145, and that "old" data of the active file system (and thus the snapshot) has not yet been flushed to disk. If a write operation is processed by the file system that replaces a block in the cache holding some of that old data, both the old and the new blocks must be maintained/preserved in the cache. In other words, the file system 310 cannot just overwrite the old data block in the cache 145 because that will destroy the snapshot data.

The flash cache is illustratively accessed, e.g., using file block numbers (fbns) for blocks in the cache (rather than disk addresses). If a client continually modifies (writes) a particular logical block in the write-back flash cache 145, it is desirable to replace that logical block in the cache. But consideration must be given to the mapping between that logical block and its physical location, particularly in the presence of a snapshot. For example, if the write anywhere file system 310 replaces a logical block, the new block is written to a new place in the flash cache 145 and the old (data) block is logically invalidated except when that data is part of a snapshot. The snapshot mappings may be illustratively maintained using a data structure such as, e.g., a balanced tree (B-tree) or an mode within an mode file.

In an illustrative embodiment, storage of information on the disk array 155 is preferably implemented as one or more storage volumes that comprise one or more disks 340 cooperating to define an overall logical arrangement of vbn space on the volume(s). Here, the RAID module 350 organizes the disks within a volume as one or more parity groups (e.g., RAID groups), and manages parity computations and topology information used for placement of data on the disks of each group. The RAID module further configures the RAID groups according to one or more RAID implementations, e.g., a RAID 1, 4, 5 and/or 6 implementation, to thereby provide protection over the disks 340 of disk array 155 in the event of, e.g., failure to one or more disks. That is, the RAID implementation enhances the reliability/integrity of data storage through the writing of data stripes across a given number of disks in a RAID group, and the appropriate storing of redundant information, e.g., parity, with respect to the striped data.

The volumes may be embodied as flexible (virtual) volumes and further organized as one or more aggregates of the secondary storage subsystem. Aggregates and virtual volumes are described in U.S. Pat. No. 7,409,494 titled Extension of Write Anywhere File System Layout, by John K. Edwards et al. and assigned to Network Appliance, Inc. The volumes may be illustratively organized as aggregates for error control, i.e., each aggregate may be associated with a file system that generally does not interact with other file systems. Thus, if one aggregate fails, that failure does not affect the other aggregates. The flash cache 145 is illustratively configured to service multiple aggregates, each of which may have different properties. In an illustrative embodiment, the flash cache is sized sufficiently to store an entire random workload, such that the secondary storage subsystem 150 may comprise large capacity, archival-class disks (instead of high-performance disks). The use of such disks allows storage of data on the disks in archival form, e.g., encrypted and de-duplicated.

A second file system, e.g., a write in-place file system 330, implements a second set of file system techniques to leverage the fast random read performance capabilities of the flash cache to write selected data (evicted from the cache) as a "tetris" I/O transaction to the disk array 155, thereby improving performance of the disks 340. That is, the write in-place file system 330 relocates the selected data to the disks in a streaming fashion using a data layout construct (i.e., the tetris I/O transaction) that represents an array of data blocks on the disks 340. An example of such an I/O transaction is described in U.S. Pat. No. 7,200,715, issued Apr. 3, 2007, entitled Method for Writing Contiguous Arrays of Stripes in a RAID Storage System Using Mapped Block Writes, by Steven R. Kleiman, et al. and assigned to Network Appliance, Inc., which is hereby incorporated by reference. By enabling operation of the secondary storage subsystem 150 in sequential or streaming mode for a majority of its accesses, the storage architecture 300 enables use of the slow, inexpensive disks 340 to provide higher bandwidth performance to client applications 112 than conventional storage systems.

In an illustrative embodiment, the write in-place file system 330 is targeted to large data container, e.g., large file, workloads and, to that end, has a data layout format that provides fast sequential read access to such large files to efficiently service data evicted from the cache and stored on the disks of the secondary storage subsystem 150. In particular, the write in-place file system illustratively has an on-disk format representation that is block-based using modes to identify files and file attributes (such as creation time, access permissions, size and block location). The file system also illustratively uses data structures to store metadata describing the layout of its file system.

Further to an illustrative embodiment, the on-disk format of the write in-place file system 330 arranges sequential portions of files on disk within regions, wherein each region comprises a predetermined amount of disk space represented by, e.g., contiguous disk blocks. The file system illustratively writes file data "in-place" within each region, wherein the data of the files stored within each region may or may not be stored sequentially within the region. A data structure, such as a space allocation map, identifies those regions that are allocated and those regions that are available (free) for allocation. The file system 330 may allocate entire regions of disk space, wherein the regions can be designated for different purposes/ roles. Illustratively, the designated role of a region can be discerned through examination of certain mode metadata (or alternatively via an identifier that indicates its role).

As noted, the write in-place file system 330 is leveraged to provide fast sequential read access capabilities to the disks 340 of the secondary storage subsystem 150. To that end, the data evicted from the flash cache 145 is flushed (written) sequentially to tracks of the disks within one or more regions in accordance with the tetris I/O transaction. As further noted, the tetris transaction is a data layout construct used, e.g., to relocate data from the cache to the disks in a streaming fashion. The tetris I/O transaction is illustratively represented as an array of data blocks on disks 340 characterized by row and column dimensions. In this context, the dimensions include a track depth (i.e., the column dimension) on each disk by a RAID group width (i.e., the row dimension), wherein the track depth is illustratively a "chunk" (e.g., 256 kB) on each disk. Notably, the tetris I/O transaction may span multiple stripes (i.e., 2 or more rows) of the RAID group.

A goal of the novel cache-based storage architecture is to stage (accumulate) enough user I/O operations in the flash cache 145 for each track in a RAID group to thereby amortize the cost of data processing across the stripes of the group. In other words, the storage architecture achieves RAID efficiency by accumulating enough information, i.e., enough random read and/or write I/O operations, to form a tetris I/O transaction. Intermixed with those I/O operations is parity, which may be distributed throughout the disks or located on one or more parity disks of the RAID group according to the specific RAID level implementation. As a result, the tetris I/O transaction enables processing of multiple stripes within a RAID group for the same cost (e.g., a revolution of each disk).

For example, in one revolution of each disk, the storage architecture is configured to read all blocks needed for the tetris I/O transaction, e.g., to retrieve any old data and old parity from each stripe included in the transaction so that, e.g., the RAID module 350 may perform all necessary (e.g., parity) computations for each disk. Thereafter, in one revolution of each disk, the architecture is configured to write all blocks for the tetris I/O transaction. Because of the inclusion of random I/O operations across the area of the transaction, the chances of having more than a few blocks in any particular parity stripe is low. In that sense, the tetris I/O transaction may be viewed as a sparse matrix. Yet, by accumulating many of those random I/O operations in the cache, all of their respective track operations can be performed at once (during a single revolution of the disk).

Another goal of the cache-based storage architecture is to organize data into logical data containers such as, e.g., small files and large files, and laying out these files serially on disk. Note that "small" and "large" files are definable in terms of storage capacity; a large file may be defined as a logical container having data comprising either more than a track or more than a tetris I/O transaction. Organizing such logical data containers serially on the disk array, particularly for large files, is advantageous when flushing evicted data from the cache to disk. Here, it is desirable that the physical order of data for the large file laid out on disk be the same as the logical order of the data within that file. By staging the data in the flash cache for a period of time, write allocation decisions can be rendered by the file system 330 that effectively transpose random write operations associated with the data to a sequential context on disk. More specifically, staging of the data in the cache enables rendering of write allocation (i.e., placement) decisions for that data on disk in accordance with, e.g., a tetris I/O transaction that is RAID efficient.

Yet another goal of the architecture is to avoid burstiness of data transfers, both into and out of the flash cache 145. Such burstiness may be avoided through the use of triggers configured to select data and initiate eviction of the selected data from the cache. As noted, one trigger may include such eviction policies as LRU and/or data type prioritization. In an illustrative embodiment, another trigger may be the accumulation of sufficient I/O operations within the cache to constitute a tetris I/O transaction. That is once enough write data has been stored in the write-back flash cache 145 for a logical container, such as a large file, a tetris transaction can be scheduled for the file.

Notably, use of the tetris I/O transaction model provides the ability to render optimized write allocation decisions as a result of the staging of data in the flash cache 145. Although small files may be written differently to disk, large files are illustratively written in-place but in a RAID efficient manner. Execution of the tetris transaction in conjunction with an illustrative data layout engine (such as the write in-place file system 330) organizes data on disk to efficiently enable sequential reading of a large file. In an illustrative optimization model embodiment, each tetris I/O transaction is associated with a large file, although an alternative model may enable commingling of multiple large files in one tetris transaction. In any event, by staging enough write data in the flash cache, a tetris I/O transaction can be performed that is RAID efficient with a write-in-place layout on disk.

In an illustrative embodiment, the use of a large flash cache 145 allows temporary storage of a large working set in the cache that may increase the probability that subsequent cache accesses will result in cache hits. For example, assume the storage system 120 receives a data access request (operation) from a client 110 to read the first 100 kB of 1 MB file. If the data of the file is stored in the cache, the file system 310 processes the operation by retrieving the requested data (the first 100 kB) from the cache and returning it to the client. Otherwise, if the data is not resident in the cache (i.e., a "cache miss"), the file system 330 retrieves the data from one or more of the disks of the disk array 155. Illustratively, the file system may retrieve an entire track of data from a disk representing, e.g., half (500 kB) of the file. Here, refilling of the flash cache enables retrieval (reading) of large sequential blocks from the disk. The 500 kB of the 1 MB file are then loaded into the flash cache 145 and the requested 100 kB is returned to the client. Advantageously, there may now be a sufficient portion of the file resident in the cache 145 to potentially satisfy any subsequent client request, e.g., for the next 100 kB of the file.

Note that in response to the cache miss, the file system 330 may refill the flash cache 145 with the data retrieved from disk 340 by loading that data either into memory 124 or directly into the flash cache. In the former case, the data loaded into memory is used to service the request prior to storing the data to the flash cache. In the latter case, a mechanism (e.g., hardware circuitry) may be needed to enable disk-to-flash cache data transfers. However, in order to support such disk-to-flash transfers, a certain amount of available free space must be reserved in the flash cache at all times.

Figure 4:
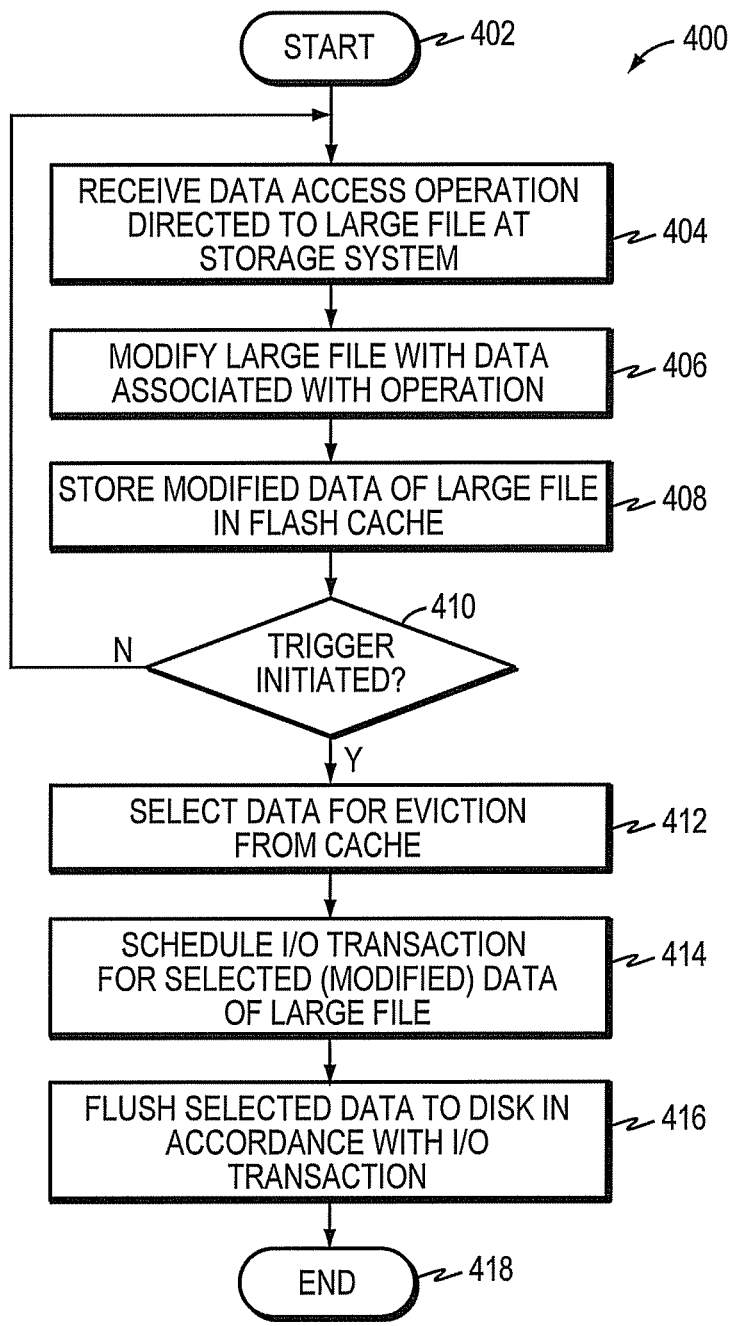
FIG. 4 is a flowchart illustrating an exemplary operational procedure of the cache-based storage architecture of the storage system in accordance with the present invention.

FIG. 4 is a flowchart illustrating an exemplary operational procedure of the cache-based storage architecture of the storage system in accordance with the present invention. The procedure 400 starts at Step 402 and proceeds to Step 404 where a data access request, e.g., a write operation, directed to a data container (e.g, a large file) is issued by a client and received at the storage system. In Step 406, the first data layout engine (i.e., the write anywhere file system) processes the write operation by, e.g., modifying the file with write data associated with the operation. In Step 408, the modified data of the large file is stored to the flash cache, e.g., during a CP of the system.

In Step 410, the policy engine implements a set of policies to determine whether a trigger is initiated to select data in the cache for eviction. As noted, the trigger may include eviction policies as LRU and/or data type prioritization; however, in an illustrative embodiment, the trigger is the accumulation of sufficient I/O operations within the cache to constitute a tetris I/O transaction. If the trigger is not initiated, the procedure returns to Step 404; otherwise, in Step 412, data is selected for eviction from the flash cache in accordance with, e.g., an optimized write allocation decision. Illustratively, the selected data comprises modified data of the large file. In Step 414, the tetris I/O transaction is scheduled for the selected data of the large file and, in Step 416, the second data layout engine (i.e., the write in-place file system) writes (flushes) the selected data to disk in accordance with the tetris I/O transaction. The procedure then ends at Step 418.

Advantageously, the use of flash memory as a cache 145 enables construction of a relatively large cache with additional storage capacity compared to conventional storage system caches. The flash cache 145 may then be configured to store and serve frequently accessed data at performance levels that exceed those of conventional storage systems. Given the read performance of a large flash cache capable of staging a sufficient amount of data, the optimizing file system techniques can effectively transpose random write operations to a sequential context (via the tetris I/O transaction) when writing data to the disks, thereby ensuring efficient operation of the disks. Slow, inexpensive disks may thus be employed as secondary storage for storing non-frequently accessed data used to, e.g., refill the cache, as well as to store point-in-time data images and compliance data. This feature of the storage architecture results in substantial performance improvement over conventional disk-based systems, thereby enabling use of substantially fewer disks in the secondary storage subsystem 150.

In addition, the use of a large flash-based cache, optimized with a write anywhere file system, allows operation of the inexpensive disks in streaming mode under substantially all workloads to provide a highly responsive storage system that obviates the use of large, expensive DRAM-based caches as well as expensive, high-performance disks. The large flash cache 145 allows servicing of a substantial number of data access requests, thus enabling the disk-based secondary storage subsystem 150 as the only rotating store in a storage system 120 configured to deliver primary, secondary and archival capabilities. Moreover, the use of file system techniques reduces the penalty in write performance (thereby improving the write performance) of the flash cache 145. Accordingly, the invention allows a single storage system to provide capabilities of high-performance primary storage, fast resilient secondary storage or large archival storage from the same storage architecture using inexpensive disks.

While there have been shown and described illustrative embodiments of a cache-based storage architecture having primary and secondary storage subsystems that are controlled by first and second data layout engines to provide a high-performance storage system, it is to be understood that various other adaptations and modifications may be made within the spirit and scope of the present invention. For example, in an alternative embodiment, the same data layout engine can be configured to control operation of both the flash cache 145 and disk array 155 of the primary and secondary storage subsystems 140, 150, respectively. Note that the data layout engine is preferably configured to provide good read and write performance for sequential and random operations, respectively.

The foregoing description has been directed to specific embodiments of this invention. It will be apparent, however, that other variations and modifications may be made to the described embodiments, with the attainment of some or all of their advantages. For instance, it is expressly contemplated that the components and/or structures described herein can be implemented as a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A storage system including a processor, comprising:
    a primary storage subsystem configured as a cache, wherein the cache includes a plurality of flash memory devices organized as one or more flash cache Redundant Array of Independent Disk (RAID) groups;
    a first data layout engine configured to implement one or more first data layout 6 techniques that improve data access performance of the primary storage subsystem by serving random data access operations directed to the cache;
    a secondary storage subsystem having disks organized as one or more disk RAID groups, wherein an array of data blocks on the disks organized as one or more disk RAID groups is characterized by row and column dimensions associated with a track depth on each disk and a disk RAID group width;
    a second data layout engine configured to implement one or more second data layout techniques that improve data access performance of the secondary storage subsystem by transposing the random data access operations into sequential access operations for storing selected data retrieved from the cache on the disks in accordance with a write allocation decision; and
    a policy engine configured to implement data type prioritization policies, based on information stored in metadata that describes the selected data to initiate eviction of the selected data retrieved from the cache to the one or more disk RAID groups based on a data type of the selected data having a higher priority than data types of other data on the cache.

2. The storage system of claim 1 wherein the first data layout engine comprises a write anywhere file system configured to implement the one or more first data layout techniques to enable placement of data anywhere in free, available space on the flash memory devices of the cache.

3. The storage system of claim 1 wherein the second data layout engine comprises a write-in-place file system configured to implement the one or more second data layout techniques to leverage fast random read performance capabilities of the cache to write the selected data as an I/O transaction to the disks, thereby improving performance of the disks.

4. The storage system of claim 1 wherein the selected data is associated with write data and the other data is associated with read data.

5. The storage system of claim 1 wherein the second data layout engine renders the write allocation decision in accordance with an input/output (I/O) transaction representing the array of data blocks on the disks.

6. The storage system of claim 5 wherein the column dimension includes the track depth and the row dimension includes the disk RAID group width.

7. A method comprising:
    configuring a primary storage subsystem of a storage system as a flash cache;
    organizing, by a Redundant Array of Independent Disk (RAID) module of the storage system, a plurality of flash memory devices of the flash cache as one or more flash cache RAID groups;
    organizing disks of a secondary storage subsystem of the storage system as at least one disk RAID group, wherein an array of data blocks on the disks organized as the at least one RAID group is characterized by row and column dimensions associated with a track depth on each disk and a disk RAID group width;
    storing, by a first data layout engine of the storage system, randomly accessed data on the plurality of the flash memory devices of the flash cache;
    managing parity computations and topology information used for the storage of the randomly accessed data on the flash memory devices of each flash cache RAID group;
    accumulating the randomly accessed data in the flash cache to form a transaction that enables processing of multiple data stripes within the flash cache RAID group during a revolution of each disk in the group; and
    relocating, by a second data layout engine of the storage system, selected data from the flash cache to the secondary storage subsystem using the transaction to enable operation of the secondary storage subsystem in sequential mode.

8. The method of claim 7 further comprising implementing a policy at a policy engine of the storage system to select the selected data, based on information stored in metadata that describes the selected type, and initiate eviction of the selected data from the flash cache based on a data type of the selected data.

9. The method of claim 7, further comprising embodying the first data layout engine as a write anywhere file system configured to enable placement of the data anywhere in available space on the flash cache.

10. The method of claim 9 further comprising controlling storage operations to the flash cache using the write anywhere file system in cooperation with the RAID module of the storage system.

11. The method of claim 7 further comprising embodying the second data layout engine as a write-in-place file system configured to arrange sequential portions of data containers on the disks within regions, wherein each region includes a predetermined amount of disk space represented by disk blocks.

12. The method of claim 11 further comprising writing, by the write-in-place file system, the selected data from the flash cache sequentially to tracks of the disks within one or more of the regions.

13. A system comprising:
a flash cache having flash memory devices organized as one or more flash cache Redundant Array of Independent Disk (RAID) groups;
a first data layout engine configured to place data anywhere in free, available space on the flash memory devices of the flash cache;
a plurality of disks;
a second data layout engine configured to write selected data to the disks, organized as a plurality of disk RAID groups, as a transaction representing an array of data blocks on the disks characterized by row and column dimensions associated with a track depth on each disk and a disk RAID group width; and
a policy engine configured to implement data type policies to initiate eviction of the selected data, based on information stored in metadata that describes the selected data from the flash cache to the disks based on a data type of the selected data having a higher priority than data types of other data on the flash cache.

14. The system of claim 13 wherein the selected data is associated with write data and the other data is associated with read data.

15. The system of claim 13 further comprising a RAID module configured to organize the disks within a volume as the plurality of disk RAID groups.

16. The system of claim 15 wherein the RAID module is further configured to manage parity computations and topology information used to place data on the disks of each disk RAID group.

17. The system of claim 15 wherein the column dimension includes the track depth on each disk and the row dimension includes the disk RAID group width.

* * * * *

UNITED STATES PATENT AND TRADEMARK OFFICE
CERTIFICATE OF CORRECTION

PATENT NO. : 8,549,222 B1  
APPLICATION NO. : 12/369502  
DATED : October 1, 2013  
INVENTOR(S) : Steven R. Kleiman et al.

Page 1 of 1

It is certified that error appears in the above-identified patent and that said Letters Patent is hereby corrected as shown below:

In the Specification

In col. 3, line 58 should read:  
back-up battery, or other built-in last̲-state-retention capabili- In col. 7, line 62 should read:  
embodiment, the topology information comprises vbn̲-to-dbn In col. 8, line 27 should read:  
traverse (walk) buffer and ~~mode~~ inode trees when "cleaning" (clear- In col. 9, line 18 should read:  
an ~~mode~~ inode within an ~~mode~~ inode file.

In col. 10, line 15 should read:  
format representation that is block-based using ~~modes~~ inodes to In col. 10, line 33 should read:  
discerned though examination of certain ~~mode~~ inode metadata (or In the Claims In col. 13, line 56 should read:  
more first data layout ~~6~~ techniques that improve data Signed and Sealed this  
Third Day of December, 2013

Margaret A. Focarino  
*Commissioner for Patents of the United States Patent and Trademark Office*